(No Model.)
J. W. NYSTROM.
ELECTRO MAGNETIC MACHINE.
No. 294,066. Patented Feb. 26, 1884.
Fig. 1.
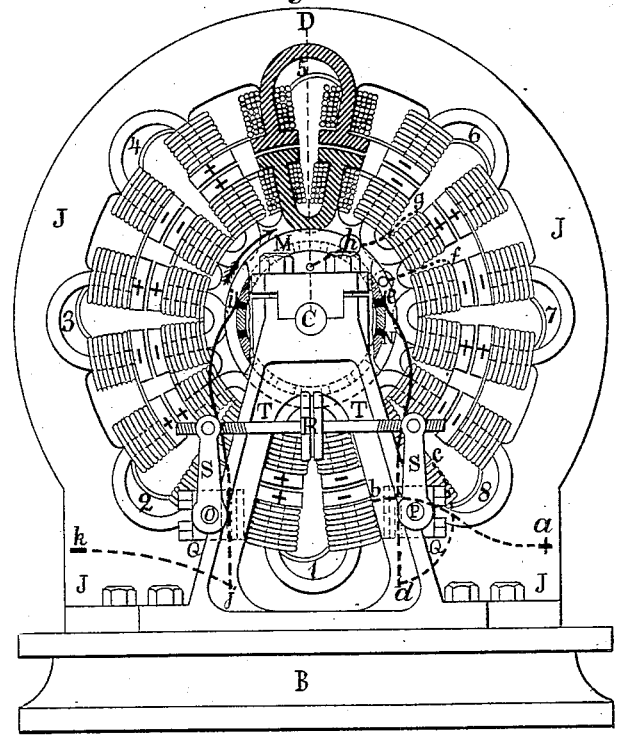
Fig. 3.
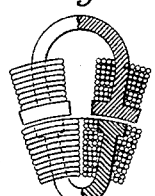
Fig. 2.
Fig. 4.
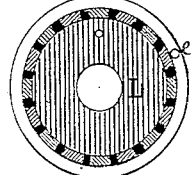
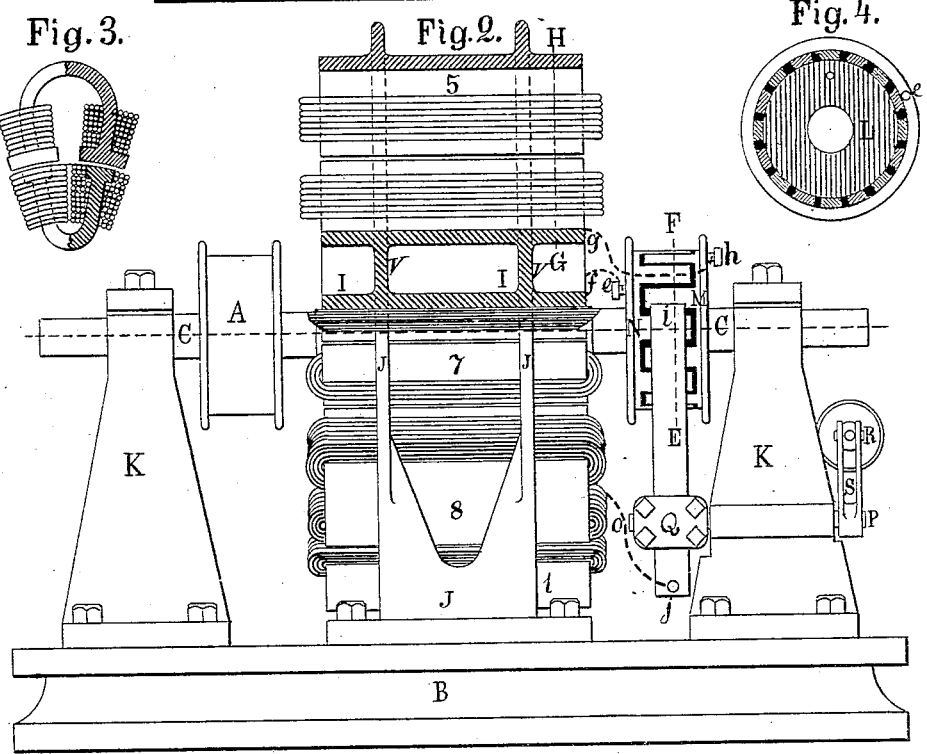
WITNESSES:
H. B. Hall
M. L. Coad
INVENTOR.
John W. Nystrom

United States Patent Office.

JOHN W. NYSTROM, OF PHILADELPHIA, PENNSYLVANIA.

ELECTRO-MAGNETIC MACHINE.

SPECIFICATION forming part of Letters Patent No. 294,066, dated February 26, 1884.

Application filed September 10, 1883. (No model.)

*To all whom it may concern:*

Be it known that I, JOHN W. NYSTROM, of the city and county of Philadelphia, in the State of Pennsylvania, have invented certain new and useful Improvements in Electro-Magnetic Machines for Generating Either Power or Electricity, of which invention the following is a full specification, referring to the accompanying drawings.

My invention consists, principally, in the form and combination of electro-magnets arranged so as to obtain a very strong magnetic field with rapid changes of polarity.

Figure 1 represents an end view of my electro-magnetic machine, showing the form and arrangement of the electro-magnets. Fig. 2 is a side elevation of the same, showing also a vertical section of the upper part through the line C D, Fig. 1. Fig. 3 represents a section of a pair of electro-magnets, showing how the coil is wound in the armature when the machine is to be used for generating electricity. Fig. 4 represents a section of the commutator through the line E F, Fig. 2.

The drawings, Fig. 1, show eight pairs of electro-magnets, numbered 1, 2, 3, 4, 5, 6, 7, and 8, making eight field-magnets and eight armature-magnets; but the machine can be made with any desired number of magnets. The fifth pair of magnets, Fig. 1, is shown in section through the line G H, Fig. 2. The parts of the magnets around which the insulated wire coils are wound are straight in the direction of the radius of the system, or nearly so, and the length of the magnets in the direction parallel to the center line of rotation is equal to the whole width of the magnetic field, or nearly so. Each magnet is made in one piece of even thickness and curved in the middle, so that its two poles face the magnetic field, the object of which is to obtain a strong magnetic force. The poles of the magnets are extended in the direction of the circumference of the magnetic field for the purpose of bringing the center of magnetic attraction nearer to the field of action. These polar extensions are made solid in one piece with each magnet, without separate polar extension-pieces. The signs on the magnet-poles mean — for the south pole and + for the north pole. The inner and outer magnets are made of a similar form, except that the armature-magnet has a sharper curve than that of the field-magnet; also, that the legs of the armature-magnet spread out and those of the field-magnet are drawn in, so as to be radial to the circular motion. The armature-magnets are cast in one piece with the hub I; also, the field-magnets are cast in one piece with the frames or ribs J; but each magnet can be made separately of cast or wrought iron and bolted to suitable framings.

On the hub I are cast two frames or thin ribs, V V, which hold the armature-magnets in proper position—that is, the hub, disks, and magnets are cast in one piece, and the disks are in the same plane as the frames J, as shown in section, Fig. 2. The solid connections of the magnets with the disks, and also with the frame J, are at the horseshoe bends, leaving the straight legs free for winding the coils.

The object of casting the magnets solid with the frames and disks, in the manner above described, is to preserve definite polarities of the maximum strength and to utilize all the magnetism in the magnetic field; also to preserve a definite neutral magnetic line in the horseshoe bend of each magnet, which cannot be attained by casting the magnets solid with heavy masses of iron the whole length of the magnet, which is generally done, particularly so in armatures cast solid with the hub. In my invention the magnets are practically isolated from such heavy masses of iron which disturb the polarity and render other machines defective.

For small machines I make only two frames and disks, as shown in the drawings; but for large machines I make three or more frames and disks. The armature system is fixed on the shaft C, so that its polar faces are concentric with those of the field-magnets, leaving only so much space in the magnetic field as to allow free rotation of the armature. The shaft C rests in bearings on the pedestals K, and the framing J and the pedestals are bolted on the bed-plate B. The commutator is composed of two pieces, M and N, each having eight contact-pieces placed alternately with one another and separated by a non-conducting substance, as shown by the black shading, Figs. 1, 2, and 4, of which the latter is a section of the commutator through the line E F, Fig. 2, showing how the contact-pieces are divided and fixed on the insulating substance L. The brushes *d e* and *i j* are fixed in and insulated from the clamps Q on the shafts O P, and by means of the arms S and right and left threaded screw T the brushes can be tightened to the commutator, or disconnected therefrom by turning the screw-head R in the proper direction. The winding of the coils around the magnets can be done in different ways, of which the method represented on the drawings is preferred when the machine is fed by a current of electricity for generating motive power. The wire enters from *a*, Fig. 1, to the south pole of the first field-magnet at *b*, from which it is continued on to the north pole, thence to the south pole of the second magnet, and so on until it reaches the north pole of the eighth field-magnet at *c*, from which the wire is connected with the brush at *d*. In the armature the wire starts from the knob *e* in the commutator to the south pole at *f* of the seventh armature-magnet, from which it is continued to the north pole, thence to the south pole of the eighth armature-magnet, and so on until it reaches the north pole of the sixth armature-magnet at *g*, from which it is connected with the knob *h* in the commutator. The brushes connect alternately at *e* and *i* with the contact-pieces, so that when one brush connects with the system M the other one connects with the system N, and thus the direction of the current in the armature is reversed sixteen times for each revolution of the system. The current leaves the machine through the brush *i j* via *k*. The magnetic poles in the armature are thus changed alternately from north to south and from south to north sixteen times for each revolution of the armature, while the polarity of the field-magnets remain constant. The result of these changes is a pulling and pushing action on the armature in the magnetic field, the power of which is transmitted by the belt-pulley A to where it is required. Similar poles repel and different poles attract one another to move the armature in the direction of the arrow. The polarity of the armature-magnets changes at the moment the polar faces come opposite one another, as represented in the drawings, Fig. 1, and the signs + and —, as marked, show that the polarity has just been changed.

When the machine is used for generating motive power, the armature runs in the direction shown by the arrow, Fig. 1; but when used for generating electricity the armature is run in opposite direction by power from the pulley A, and the coils on the field-magnets are excited in the usual way.

When the machine is constructed especially for generating electricity, the polar extensions of the armature-magnets are made narrower, so as to allow the coil to be wound close to the magnetic field, as shown in Fig. 3.

The parts M and N of the commutator can each be divided into two or four parts for different systems of winding the coils and for generating two or more separate currents of electricity, of which one current may be used for exciting the field-magnets.

I claim—

1. In an electro-magnetic or magneto-electric machine, the elongated and curved magnets having polar extensions solidly formed in one piece with each leg of both the field and armature magnets, arranged so that both the poles of each magnet are in the magnetic field, substantially as and for the purpose described.

2. In an electro-magnetic or magneto-electric machine, the curved magnets, cast solid in one piece with their supporting frames or ribs, so that both the poles of each magnet are in the magnetic field, and that the neutral magnetic line is in the horseshoe bend, substantially as and for the purpose described.

3. The combination of the shafts O P with the brush-clamps Q at the inner ends, the levers S at the outer ends, and the screw T, the levers being connected with the screw for the purpose of regulating the pressure of the brushes upon the commutator.

JOHN W. NYSTROM.

Witnesses:
H. B. HALL,
M. I. COAD.